Jan. 31, 1950 LE ROY S. JESSEN 2,495,732
TOW CABLE CUTTER

Filed May 3, 1946 2 Sheets-Sheet 1

INVENTOR.
LeRoy S. Jessen
BY
ATTORNEYS

Jan. 31, 1950      LE ROY S. JESSEN      2,495,732
TOW CABLE CUTTER
Filed May 3, 1946      2 Sheets-Sheet 2
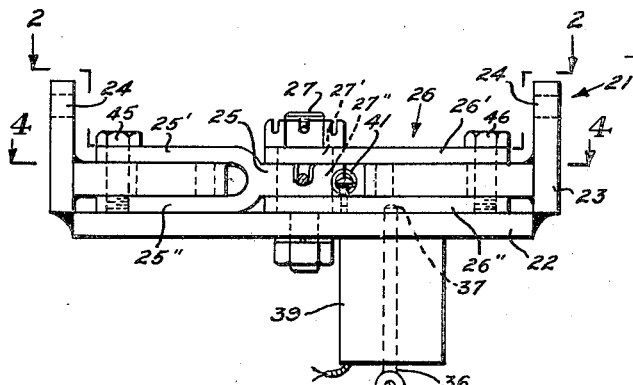
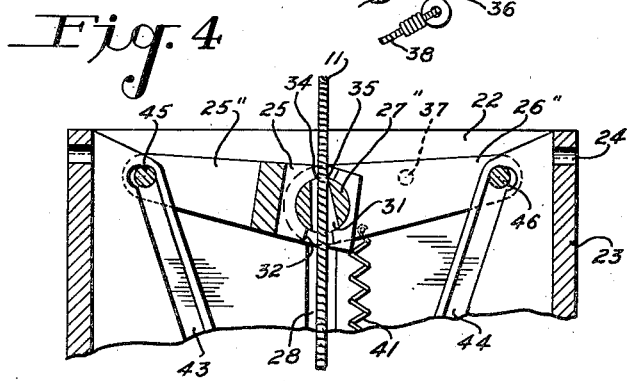
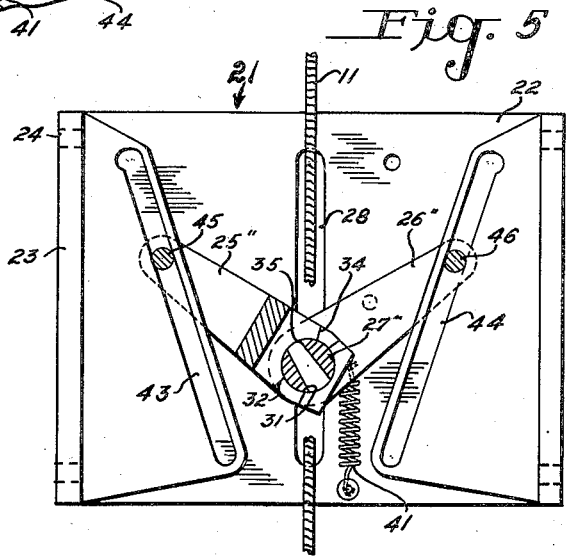
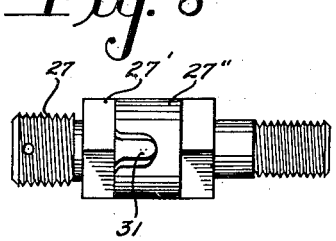
INVENTOR.
LE ROY S. JESSEN
BY
ATTORNEYS Patented Jan. 31, 1950

2,495,732

UNITED STATES PATENT OFFICE 2,495,732

TOW CABLE CUTTER

Le Roy S. Jessen, Dayton, Ohio

Application May 3, 1946, Serial No. 666,935

9 Claims. (Cl. 164—40)

(Granted under the act of March 3, 1883, as amended April 30, 1928; 370 O. G. 757)

The invention described herein may be manufactured and used by or for the Government for governmental purposes without payment to me of any royalty thereon.

This invention relates to a cutting device adapted for speedily cutting the towing cable carried by one vehicle, and especially an aircraft, in towing another.

Where one vehicle is towing another, whether the vehicles be adapted for traveling in the air or on the land or in the water, it sometimes becomes imperative that the towing cable which connects such vehicles be cut quickly, so as to facilitate separation of the vehicles speedily when an emergency arises; and this is especially the case when one aircraft is towing another, as a glider, and they are subjected to sudden enemy attack.

It is an essential object of this invention to provide a device for quickly cutting the towing cable carried by one aircraft or vehicle in towing another, and to arrange this device so as to utilize the force of drag exerted on the cable by the towed vehicle, in order to provide abundant force for quickly and effectively cutting the cable and separating the vehicles.

Another object of this invention is to provide such a cable cutter wherein the cutting mechanism that is normally held in idle position can be readily released at will, so that the cutting mechanism will be set in motion and thereupon the force of drag of the towed plane on the towing cable will be instrumental for completing the prompt cutting of the cable.

Another object of this invention is to provide such a cable cutter that operates quickly without requiring either of the more complicated and expensive powers, such as hydraulic or electric or explosive power, nor the manual power which is not sufficiently forceful, for speedily cutting a heavy tow cable as is used in towing an aircraft.

Another object of this invention is to provide an effective tow cable cutter which is arranged so that it is simple in structure and is compact and small in size, and thus requires but a small space and may therefore be readily installed in one of numerous convenient locations in an airplane.

These and various other objects and advantages are attained with this invention, as will become apparent from the following description, taken in connection with the accompanying drawings wherein the invention is shown in its preferred form, it being evident that other arrangements and forms of construction may be resorted to in carrying out the objects and purposes of this invention.

In the drawings:

Fig. 3 is a rear elevational view of the cutter, looking forwardly of the towing cable.

Fig. 4 is a fragmentary sectional view taken on line 4—4 of Fig. 3, showing the levers slightly tilted and the cutting means in the initial cable-shearing position.

Fig. 5 is a view of the cutter, similar to Fig. 2, but showing the levers and the cutting means in their position after the cable is entirely cut.

Fig. 6 is a view of the cutting bolt.

Figure 1:
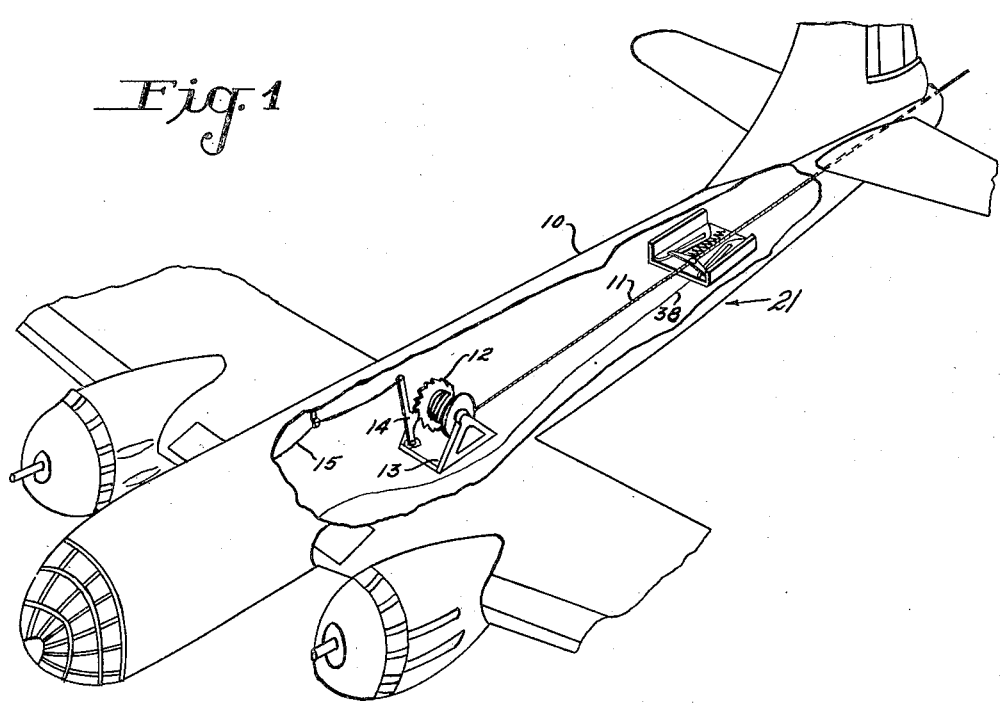
Fig. 1 is a view of an airplane equipped with a plane towing cable, with my invention mounted in said airplane and applied to said cable.

In the drawings, my invention is illustrated as applied to a towing vehicle 10, which is shown in the form of a fighter aircraft or airplane, and it is provided with a towing cable 11 having its forward part operably attached in the airplane by winding it upon a windlass 12 mounted in the plane by suitable means 13 and being normally retained in its idle position by a pawl 14 or other means for holding the cable against release movement. Said means 14 is shown herein as being releasable by manually operable means 15 or the like. During operation the cable 11 extends rearward of plane 10 to another plane or glider (not shown), which is being towed thereby.

My novel cutter 21 comprises a base or supporting member 22 whereby the cutter is mounted securely in a suitable position in the towing airplane 10, as by means of flanges 23 having apertures 24 therein for receiving securing bolts whereby to fasten the cutter in the airplane in association with the cable 11, so as to have the cable passing through the cutter.

The form of cutter structure disclosed herein comprises a pair of levers 25 and 26 pivotally connected by a bolt 27 and thereby mounted on the base 22, to afford relative swinging movement between the levers. The lever 25 includes an upper branch arm 25' and a lower arm 25'', and the lever 26 includes an upper link 26' and a lower link 26'' with the inner end of lever 25 therebetween.

Figure 2:
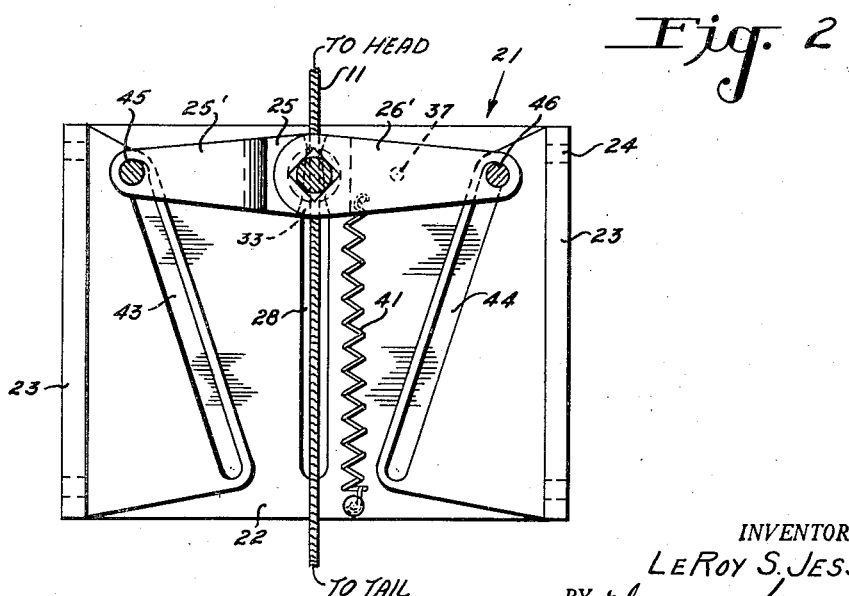
Fig. 2 is a part plan and part sectional view taken on line 2—2 of Fig. 3, showing the cutter in its idle position.

The bolt 27 is arranged to turn with one of the levers, as by an angular part 27' seated in lever 26, and to turn in the other lever, as by a circular part 27'' rotary in lever 25; and this bolt is slidable in a slot 28 extending longitudinally of the base and thus also provides for sliding movement of the levers on the base. The bolt is provided with a diametrical channel or passage 31, and the lever 25 is provided with a transverse slot or passage 32, so that when the levers are in idle position these passages will be aligned and form a channel or passageway 33 wherein the cable 11 is loosely seated and is adapted to slide readily therethrough, as indicated in Fig. 2 of the drawing. Cutting edges or cutting elements 34 and 35 are provided on the lever 25 and the bolt 27, at the edges of their passages 32 and 31, respectively, so as to operate substantially with a shearing effect.

These levers are normally retained in idle position by suitable holding means, such as a pin 36 engaging in an aperture 37 in one of the levers, and said pin being releasable by the pilot or crew member by a manually operable element 38, as a cord extending from said pin, or a solenoid 39 which is electrically actuated for releasing said pin. Similar electric means may also be used for releasing the windlass in connection with the releasing of this solenoid 39.

For the purposes of assuring that the levers will operate so that the cutting means will promptly take a firm cutting bite on the cable, as soon as the holding pin 36 is released, means is herein provided for initially moving the levers into cable cutting position. This means is readily provided in the form of a spring 41 having one end connected to lever 26 and the other end to the base 22, as shown in Fig. 2, adapted to pull the levers with their pivoting bolt 27 down along the slot 28 and swing the levers with their cutting elements initially from their idle and aligned position into the tilted cable cutting position. This causes the cutting edges 34 and 35 to bite firmly into the cable, as shown in Fig. 4, whereupon, the force of drag of the towed airplane on the cable, which is being released from the windlass, will be utilized to continue and complete the cable cutting operation.

Cooperating means is furthermore provided, which will preferably operate with a camming action, to guide the levers in their cutting movement and to cause forceful cutting motion thereby, for speedily cutting the cable. This cooperating guide means comprises a pair of slanting slots 43 and 44 provided in the base, said slots converging rearwardly thereon; and also comprises a pair of bolts 45 and 46 positioned in the outer ends of the levers 25 and 26 and being slidable rearwardly in said slots 43 and 44 as the levers are being tilted and moved rearwardly during the cutting operation, which is being effectuated by the force of drag of the released cable, until said cable is entirely cut and the towed plane is released.

For operating this device while towing one airplane or vehicle by another, it is merely necessary to release the holding means which holds the pawl 14 on the windlass and which holds the pin 36 in the lever, whereupon the spring 41 will initially move the levers with their cutting elements into firm cutting engagement with the cable, as shown in Fig. 4 of the drawing, and thereafter the cable, which at the time is unwinding from the windlass and is then traveling rearwardly through the cutter, will become operative for utilizing the force of drag exerted by the towed vehicle on the towing cable to continue tilting the levers and actuating the cutting means, for shearing the cable. In the meantime, the bolts at the outer ends of the levers are moved rearwardly in the converging slots provided in the base 22 of the cutter, whereby said slots operate with a camming action to force the levers inwardly toward a folded-together position and thus aid in promptly and effectively cutting the cable.

I claim:

1. A cutter for cutting a towing cable used in towing one vehicle by another, said cutter being mountable on the towing vehicle and including cutting means positioned close to the towing cable and normally retained idle, means operable to render the cutting means initially active and bring them into cable cutting position, means associated with said cutting means operable by the drag on the cable being cut to complete the cutting of said cable, and means to guide the movement of said cutting means, whereby the continued movement of said cutting means for cutting the cable is caused by the force of drag exerted by the towed vehicle on the cable.

2. A cutter for cutting a towing cable used in towing one vehicle by another, said cutter comprising a support securable in position on the towing vehicle, coacting cutting means movably mounted on said support and positioned adjacent the cable, means normally retaining the cutting means under stress in an idle noncutting position, means for releasing said retaining means and let the cutting means move to cable-cutting position, linkage operatively connected to said cutting means operable by the drag on the cable being cut to complete the cutting of said cable, and cooperating means on the support and on the cutting means to guide the operative movement of the latter, whereby the force of drag exerted by the towed vehicle on the cable is utilized to cause the continuing movement of the cutting means for cutting the cable.

3. A cutter for cutting a towing cable used in towing one vehicle by another, said cutter comprising a support securable in position on the towing vehicle, coacting cutting members movably mounted on said support and including coacting cutting means normally positioned to receive the cable slidably there-between, means to urge the cutting means initially into firm engagement with the cable, means normally retaining the cutting means in an idle noncutting position and also retaining said urging means under stress, means for releasing said retaining means, and cooperating means on the support and on the cutting means to guide the movement of the latter means, whereby the force of drag exerted by the towed vehicle on the cable is utilized to cause the continuing movement of the cutting means for completely cutting the cable.

4. A cutter for cutting the towing cable used in connecting the towed vehicle to its towing vehicle, said cutter comprising a support arranged to be secured in position on the towing vehicle, companion levers swingably mounted on the support and provided with shearing elements normally spaced apart and located idly at opposite sides of the cable, means to retain said levers with shearing elements in noncutting position, guide means on said support cooperating with means on the levers to urge the latter into swinging movement during operation, means selectively operable to release the retaining means, and means for initially moving said members and elements into cable cutting position, whereupon the continuing movement of said members along the guide means for fully cutting the cable is caused by the force of drag exerted by the towed vehicle on the cable.

5. A cutter for cutting the towing cable used in connecting the towed vehicle to its towing vehicle, said cutter comprising a support arranged to be secured in position on the towing vehicle, companion members movably mounted on said support and provided with a pair of shearing elements normally spaced and forming a passage wherein the cable is freely movable, means to retain said members with elements in noncutting position, guide means on said support cooperating with means on the members to guide the latter in their cutting movement, means selectively operable to release the retaining means, and means for initially moving said members and elements into cable cutting position, whereupon the continuing movement of said members along the guide means for fully cutting the cable is caused by the force of drag exerted by the towed vehicle on the cable.

6. A cable cutter mountable on a towing vehicle which includes a towing cable and means normally holding the cable quiescent thereon while towing another vehicle, said cutter comprising movable companion members provided with coacting cutting means normally held idly adjacent the cable, means selectively operable to release for action both of the said holding means for said cable and for said members so as to initially bring the cutting means into cutting contact with the cable, and guide means for said members, whereby to utilize the force of drag exerted by the towed vehicle on the cable for forcefully and completely cutting the cable.

7. A cutter for cutting a cable used on a towing plane in dragging another plane, wherein the former plane includes means normally retaining the cable quiescent, said cutter comprising a support securable on the towing plane, companion members movable on the support and provided with companion shearing elements, means holding said members with the elements placed in noncutting position at the opposite sides of the cable, cooperating means on the support and on the members to guide the latter in their cutting movements, means under stress to initially urge the members and elements toward their cutting position, and means selectively operable to release both of the holding means for said cable and for said members, whereby the force of drag exerted by the towed plane on the cable will be utilized to cause continued movement of said members in fully cutting the cable.

8. A cutter for cutting the cable used on a towing plane in towing another plane wherein the former plane includes means normally holding the cable quiescent, said cutter comprising a support secured on the towing plane, companion levers mounted for relative swinging movement on said support and provided with companion passages having cutting means thereon wherebetween the cable is freely movable, means holding said levers and cutting means in idle position relative to the cable, guide means slanting on the support and means on the levers cooperating therewith to swing the levers together during cutting operation, means for initially urging the levers into cutting position, and means selectively operable to release both the levers holding means and the cable holding means, in order that the force of drag exerted by the towed plane on the cable will be utilized to cause continued movement of the levers in fully and in promptly cutting the cable.

9. A cutter for cutting the cable used on a towing plane in towing another plane wherein the former plane includes cable fastening means normally holding the cable in its towing position, said cutter comprising a support secured on the towing plane, companion levers and a bolt fixed on one lever and swingably engaging the other lever for mounting them swingably and slidably on the support, the bolt and the lever swingably engaged thereby containing a pair of aligned passages provided with a pair of cutting edges, said passages being adapted to receive the cable slidably therein, means holding said levers and bolt with the cutting edges in the idle position around the cable, a pair of converging guide means on the support and means on the levers cooperating therewith to provide a camming effect on the moving levers, means for initially urging the levers into cutting position, and means selectively operable to release both the levers and the cable holding means, so that the force of drag exerted by the towed plane on the cable will be utilized to cause continued movement of the levers in promptly and completely cutting the cable.

LE ROY S. JESSEN.

REFERENCES CITED

The following references are of record in the file of this patent:

UNITED STATES PATENTS

| Number | Name | Date |
|---|---|---|
| 1,867,033 | Spang | July 12, 1932 |